(12) United States Patent
Martin et al.

(10) Patent No.: US 6,866,797 B1
(45) Date of Patent: Mar. 15, 2005

(54) CORROSION INHIBITORS AND METHODS OF USE

(75) Inventors: Richard L. Martin, Pinehurst, TX (US); Gene F. Brock, The Woodlands, TX (US); James B. Dobbs, Houston, TX (US)

(73) Assignee: BJ Services Company, Houston, TX (US)

( * ) Notice: Subject to any disclaimer, the term of this patent is extended or adjusted under 35 U.S.C. 154(b) by 17 days.

(21) Appl. No.: 09/922,231

(22) Filed: Aug. 3, 2001

Related U.S. Application Data

(60) Provisional application No. 60/222,557, filed on Aug. 3, 2000.

(51) Int. Cl.$^7$ .................................................. C09K 3/00
(52) U.S. Cl. ........................... 252/389.23; 252/389.2; 507/238; 507/240; 507/256; 507/939
(58) Field of Search ..................... 252/389.23, 389.2; 507/939, 238, 240, 256

(56) References Cited

U.S. PATENT DOCUMENTS

| | | |
|---|---|---|
| 3,931,023 A | 1/1976 | Dounchis |
| 3,932,296 A | 1/1976 | Byth |
| 3,945,849 A | 3/1976 | Hoffman |
| 3,950,534 A | 4/1976 | Yagihara et al. |
| 3,974,220 A | 8/1976 | Heiss et al. |
| 3,982,894 A | 9/1976 | Annand et al. |
| 3,992,309 A | 11/1976 | Dounchis |
| 4,087,273 A | 5/1978 | Garrison et al. |
| 4,087,386 A | 5/1978 | Dounchis |
| 4,110,319 A | 8/1978 | Lawrence |
| 4,146,709 A | 3/1979 | Quinlan |
| 4,146,711 A | 3/1979 | Quinlan |
| 4,147,715 A | 4/1979 | Tilles et al. |
| 4,193,891 A | 3/1980 | McKay |
| 4,200,633 A | 4/1980 | Quinlan |
| 4,200,634 A | 4/1980 | Quinlan |
| 4,217,329 A | 8/1980 | Quinlan |
| 4,259,483 A | 3/1981 | Quinlan |
| 4,264,768 A | 4/1981 | Quinlan |
| 4,295,979 A | 10/1981 | Sharp et al. |
| 4,309,383 A | 1/1982 | Quinlan |
| 4,314,841 A | 2/1982 | Scher |
| 4,316,007 A | 2/1982 | Quinlan |
| 4,323,459 A | 4/1982 | Quinlan |
| 4,323,461 A | 4/1982 | Quinlan |
| 4,326,585 A | 4/1982 | McStravick |
| 4,336,156 A | 6/1982 | Quinlan |
| 4,339,349 A * | 7/1982 | Martin et al. ............... 507/238 |
| 4,342,584 A | 8/1982 | Quinlan |
| 4,346,217 A | 8/1982 | Quinlan |
| 4,371,497 A | 2/1983 | Quinlan |
| 4,372,775 A | 2/1983 | Quinlan |
| 4,416,333 A | 11/1983 | Mundhenk et al. |
| 4,418,195 A | 11/1983 | Quinlan |
| 4,420,414 A | 12/1983 | Valone |
| 4,435,361 A | 3/1984 | DaGue et al. |

(List continued on next page.)

OTHER PUBLICATIONS

James B. Dobbs, "Anti–Biofoulant Corrosion Inhibitors", article presented at the New Orleans Offshore Corrosion Conference, Dec. 1998, 9 pages.

(List continued on next page.)

Primary Examiner—Philip C. Tucker
(74) Attorney, Agent, or Firm—Brinks Hofer Gilson & Lione

(57) ABSTRACT

A class of quaternary ammonium compounds are found to be effective as corrosion inhibitors. These quaternary ammonium compounds may be used alone or in combination with additional components. For example, phosphate esters can be used with the quaternary ammonium compounds. Moreover, thiocarbonyl compounds can also be added to the corrosion inhibitor compositions. These corrosion inhibitors are effective against ferrous metal corrosion, especially under downhole conditions.

34 Claims, 7 Drawing Sheets

U.S. PATENT DOCUMENTS

| | | |
|---|---|---|
| 4,460,482 A | 7/1984 | Wu |
| 4,461,713 A | 7/1984 | Anzenberger, Sr. |
| 4,486,449 A | 12/1984 | Kisida et al. |
| 4,494,977 A | 1/1985 | Quinlan |
| 4,498,997 A | 2/1985 | Walker |
| 4,509,974 A | 4/1985 | Gray et al. |
| 4,511,001 A | 4/1985 | Wu |
| 4,511,480 A | 4/1985 | Outlaw et al. |
| 4,521,320 A | 6/1985 | Spivack et al. |
| 4,525,479 A | 6/1985 | Das et al. |
| 4,547,303 A | 10/1985 | Deck et al. |
| 4,556,110 A | 12/1985 | Wu |
| 4,582,528 A | 4/1986 | Gray et al. |
| 4,636,256 A | 1/1987 | Valone |
| 4,650,594 A | 3/1987 | Wu |
| 4,655,287 A | 4/1987 | Wu |
| 4,664,193 A | 5/1987 | Wu |
| 4,668,800 A | 5/1987 | Meyer et al. |
| 4,689,387 A | 8/1987 | Kajimoto et al. |
| 4,692,186 A | 9/1987 | Gray et al. |
| 4,720,497 A | 1/1988 | Cerny et al. |
| 4,738,897 A | 4/1988 | McDougall et al. |
| 4,758,359 A | 7/1988 | Kirk et al. |
| 4,785,109 A | 11/1988 | Meyer et al. |
| 4,787,455 A | 11/1988 | Snavely, Jr. et al. |
| 4,846,980 A | 7/1989 | Valone |
| 4,867,888 A | 9/1989 | Valone |
| 4,946,923 A | 8/1990 | Nagata et al. |
| 4,950,474 A | 8/1990 | Hinrichsen et al. |
| 4,964,468 A | 10/1990 | Adams et al. |
| 4,971,709 A | 11/1990 | Tillis et al. |
| 4,980,366 A | 12/1990 | Johnson et al. |
| 5,002,673 A | 3/1991 | Williams et al. |
| 5,081,209 A | 1/1992 | Wu et al. |
| 5,084,210 A | 1/1992 | Teeters |
| 5,130,034 A | 7/1992 | Williams et al. |
| 5,135,999 A | 8/1992 | Wu et al. |
| 5,153,219 A | 10/1992 | Faiman et al. |
| 5,174,913 A | 12/1992 | Alford et al. |
| 5,180,416 A | 1/1993 | Katou et al. |
| 5,205,951 A | 4/1993 | MacKinnon |
| 5,223,477 A | 6/1993 | Scher et al. |
| 5,246,607 A | 9/1993 | Schaefer et al. |
| 5,292,480 A | 3/1994 | Fischer et al. |
| 5,344,674 A | 9/1994 | Wu |
| 5,380,466 A | 1/1995 | Martin |
| 5,393,464 A * | 2/1995 | Martin ............... 252/389.23 |
| 5,459,125 A | 10/1995 | Ohlsen et al. |
| 5,464,551 A | 11/1995 | Deetman |
| 5,531,934 A | 7/1996 | Freeman et al. |
| 5,565,416 A | 10/1996 | Wu |
| 5,590,716 A | 1/1997 | Mansfield |
| 5,611,991 A | 3/1997 | Naraghi |
| 5,611,992 A | 3/1997 | Naraghi et al. |
| 5,639,465 A | 6/1997 | Huang et al. |
| 5,648,575 A | 7/1997 | Klomp et al. |
| 5,667,957 A | 9/1997 | Lushington et al. |
| 5,756,004 A | 5/1998 | Brezinski |
| 5,759,485 A | 6/1998 | Fischer et al. |
| 5,785,895 A * | 7/1998 | Martin ............... 252/389.23 |
| 5,843,873 A | 12/1998 | Butke et al. |
| 5,922,652 A | 7/1999 | Kowalski et al. |
| 5,925,601 A | 7/1999 | McSherry et al. |
| RE36,291 E | 9/1999 | Martin |
| 5,976,416 A | 11/1999 | Brezinski |
| 5,977,395 A | 11/1999 | Boivin et al. |
| 6,063,972 A | 5/2000 | Duncum et al. |
| 6,089,322 A | 7/2000 | Kelley et al. |
| 6,251,836 B1 | 6/2001 | Duncum et al. |
| 6,517,617 B1 * | 2/2003 | Chartier ............... 252/389.2 |

OTHER PUBLICATIONS

R. L. Martin et al., "*Accelerated Corrosion of Steel by Suspended Iron Sulfides in Brine*", Corrosion, vol. 37, No. 5, 1981, pp 297–301.

R. L. Martin, "*Potentiodynamic Polarization Studies in the Field*", Materials Performance, vol. 18, No. 3, 1981, pp 41–50.

R. L. Martin et al., "Diagnosis and Inhibition of Corrosion Fatigue and Oxygen Influenced Corrosion in Oil Wells", Materials Performance, vol. 22, No. 9, 1983, pp 33–36.

R. L. Martin, "*Corrosion Consequences of Oxygen Entry into Sweet Oilfield Fluids*", Society of Petroleum Engineers, SPE No. 71470, Sep. 2001, 10 pages.

Application Guide titled "TECHNi–CHEK, Anti–Biofoulant Corrosion Inhibitors", printed by UNICHEM, a division of BJ Services Company, Nov. 1999, 32 pages.

* cited by examiner

CORROSION INHIBITORS AND METHODS OF USE

RELATED APPLICATIONS

The present application claims the benefit of the filing date pursuant to 35 U.S.C. § 119(e) of, Provisional Application Ser. No. 60/222,557, filed Aug. 3, 2000, which is hereby incorporated by reference.

BACKGROUND

As the urgency for petroleum production increases, situations arise with increasing frequency where air (containing oxygen) comes in contact with normally anaerobic fluids. It has been observed for years that oil field fluids that contact air can become many times more corrosive and, independently, corrosion inhibitors are not as effective against corrosion of iron and ferrous base materials under these conditions. These conditions are frequently difficult to diagnose and even more difficult to control.

In pumped producing wells, faster pumping in combination with reduced fluid flow into the well bore results in the annular space between outer casing and the production tubing no longer being filled with liquid. Pressures inside this space can become negative so air can be pulled into the gas filled cavity. In this rather commonly existing situation air can readily migrate to fluids in the region of the downhole pump causing corrosion damage there. In addition, air is picked up by the pump and forced up the production tubing causing additional corrosion damage to that tubing as well as sucker rods in the case of rod pumped wells.

Other instances of air contact with oil field fluids can occur because of secondary or tertiary recovery operations to recover more petroleum from the petroleum bearing formations within the earth. One example is in situ combustion operations which require air to be pumped into oil-bearing formations; not all of the oxygen in this air is consumed in the combustion and the excess gives rise to severe corrosion. A more common practice is that of pumping water into the formation to increase flow into producing wells in that formation. Air can be initially dissolved in this water if it is from a source at or near the earth's surface. If this water is being separated from produced fluid, it can pick up air during holding and pumping operations. In either case, air in these fluids can cause bad corrosion in both surface and downhole equipment. This corrosion also has serious indirect consequences because solid corrosion products form and cause plugging of inline filters and even worse, can plug pores in the formation rock so the rate of water injection is diminished.

Before the discovery of the oxygen-sulfur phosphate corrosion inhibitors, the typical solution to the air-contact-corrosion problem in pumped oil wells was to locate and eliminate any possible leak into the negative-pressure annular cavity. This is very difficult to accomplish in many cases, impossible in some.

In many oil field operations, contact of fluids with air is inevitable; two examples are the previously mentioned in situ combustion recovery stimulation, and the drilling fluids used to drill into potential petroleum bearing formations. With secondary recovery waters, however, the general rules are: Keep the air from contacting the water in the first place if at all possible; and, use chemical or mechanical scavengers to remove the oxygen if it does enter. When the water source is brine associated with produced petroleum, blanketing of holding tanks and pumps with gas-containing-no-oxygen is required to prevent air (oxygen) contact. As oil fields produce less natural gas and purchased gas prices increase, this practice becomes much less attractive. Other blanketing methods have been tried but have not proven effective at preventing oxygen entry.

In the event a water source is used which already contains oxygen—such as water from rivers, lakes, or shallow wells—chemical or mechanical scavenging is sometimes practical. Chemical reducing agents can be used to remove oxygen. Conditions must be controlled, however, so that oxygen removal is complete yet little unreacted excess scavenger remains. Mechanical scavenging can be accomplished by vacuum de-aeration treatment or counter-current scrubbing with a non-oxygen-containing gas. These methods also call for close control and are never applied to smaller quantities of water for economic reasons. In total, there are many systems where a one step corrosion inhibitor would be preferred and more economical than separate steps of scavenging and then addition of a corrosion inhibitor effective only in the absence of oxygen.

Even when oxygen is not in the corrosion system, oilfield corrosion is associated with deposition conditions. Iron sulfide or other solid particles can deposit on the steel surface and prevent corrosion inhibitors from accessing the surface. In some cases, these deposits can act as harbors for anaerobic bacteria which can also become involved in the corrosion process. Sulfate-reducing bacteria even produce their own environment beneath a biofilm that is safe from turbulence and flow velocities. As the biofilm grows, it forms an exoskeleton, which provides for sessile bacteria growth. Hydrogen sulfide is produced by the bacteria's metabolic processes and is released to the protected environment where it reacts with dissolved iron from the corrosion process to form iron sulfide. This combines with polysaccharides and other related molecules to form the cell walls with dead bacteria to produce a semi-permeable matrix we know as biofilm. Within the pores of these layers, its sulfate-reducing bacteria (SRB) grow and produce highly localized concentrations of $H_2S$, accelerating the corrosion process and causing severe pitting. As the biofilm increases in volume, the ability to reach the bacteria with normal biocide treatment is reduced. Larger doses of biocide and longer contact time then produce only marginal performance, at best. This biofilm limits access to the metal by the filming corrosion inhibitor and the corrosion inhibition is further compromised.

The presence of $H_2S$ and $CO_2$ further enhances corrosion. Electrochemical polarization curves had been used to show the particular conditions responsible for ferrous metal corrosion when oxygen contacts both sour ($H_2S$) and sweet ($CO_2$) production fluids. A test method for sour corrosion is to suspend linear polarization probes in brine made up with ferric ions and sparged with hydrogen sulfide. After fully saturating with hydrogen sulfide, the sparge is changed to air at a low flow rate. This test duplicates the desired conditions in sour fluids because of the oxidizing power of ferric ions early in the test plus the further oxidizing power of oxygen from air later in the test. A test method for sweet fluids is to suspend linear polarization probes in a brine continuously sparged with a $CO_2$/air mixed gas. Electrochemical polarization tests show that the particular gas ratio used gives a reasonable contribution of both $CO_2$ and oxygen to the corrosion and inhibition mechanisms. Test results typically correlate with field experience for established inhibitors in both categories.

The ideal chemical treatment would keep the metal surfaces free of deposits and inhibit the metal from a corrosive environment. This approach would prevent corrosion by-products (oxides and sulfides) that form deposits and foul the system. Bacterial growth would be discouraged because bacteria could not find a holiday in the inhibitor film where they could adhere to the metal and find a safe place to multiply. The bacteria would remain as a sessile form and this would significantly reduce microbiologically induced corrosion. If bacteria were detected, an EPA registered biocide would effectively sterilize the system. Water quality could be improved, drag effect would be reduced and the need for biocide treatments would be significantly reduced. All of these factors translate into lower operating costs.

At least for the foregoing reasons, there exists a need for a composition and method of inhibiting corrosion of downhole equipment.

BRIEF SUMMARY

In a first embodiment of the invention, there is a composition, comprising a quaternary ammonium compound of formula (I)

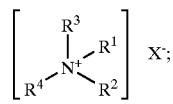
(I)

and a phosphate ester of formula (II);

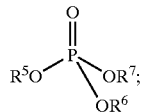
(II)

wherein $R^1$, $R^2$, $R^3$, $R^4$ are independently a hydrocarbyl group; X is selected from the group consisting of halide and sulfate; and $R^5$, $R^6$, and $R^7$ are independently selected from the group consisting of hydrogen, a hydrocarbyl group, and a polyoxyalkylated alcohol.

These embodiments may further comprise a thiocarbonyl compound of formula (III)

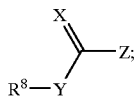
(III)

wherein $R^8$ is selected from the group consisting of metal ion, ammonium ion, hydrocarbyl, and heterohydrocarbyl; X and Y are independently selected from the group consisting of oxygen and sulfur; Z is selected from the group consisting of $OR^9$ and $NR^{10}R^{11}$; and $R^9$, $R^{10}$, and $R^{11}$ are independently selected from the group consisting of hydrocarbyl and heterohydrocarbyl.

In a second embodiment of the invention, there is provided a composition, comprising a quaternary ammonium compound of formula (I)

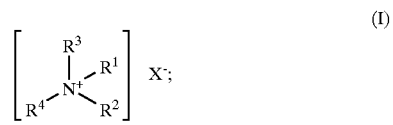
(I)

wherein $R^1$, $R^2$, $R^3$, $R^4$ are independently a hydrocarbyl group; a phosphate ester of formula (II);

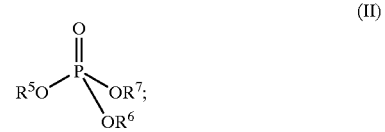
(II)

wherein X is selected from the group consisting of halide and sulfate; and $R^5$, $R^6$, and $R^7$ are independently selected from the group consisting of hydrogen, a hydrocarbyl group, and a polyoxyalkylated alcohol; and a thiocarbonyl compound of formula (III);

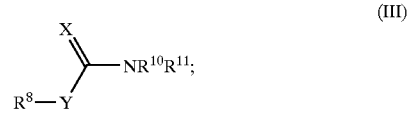
(III)

wherein $R^8$ is selected from the group consisting of metal ion, ammonium ion, hydrocarbyl, and heterohydrocarbyl; X and Y are selected from the group consisting of oxygen and sulfur, such that at least one of X and Y is sulfur; and $R^{10}$ and $R^{11}$ are independently selected from the group consisting of hydrocarbyl and heterohydrocarbyl.

These embodiments may further comprise a composition wherein the quaternary ammonium compound is didecyl dimethyl ammonium chloride; the phosphate ester is poly (oxy-1,2-ethandiyl) tridecyl hydroxy phosphate; and the thiocarbonyl compound is potassium dimethyl dithiocarbamate.

In a third embodiment of the invention, there is a method of inhibiting corrosion of iron and ferrous base materials, comprising contacting iron or a ferrous base material with any of the above compositions.

In a fourth embodiment of the invention, there is provided a method of making a corrosion inhibitor, comprising combining a quaternary ammonium compound of formula (I)

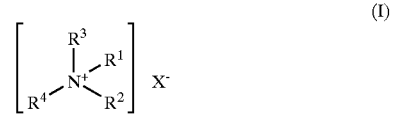
(I)

with a phosphate ester of formula (II)

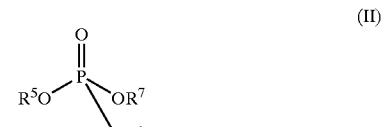
(II)

and, optionally, further with a thiocarbonyl compound of formula (III)

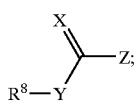

(III)

wherein $R^8$ is selected from the group consisting of metal ion, ammonium ion, hydrocarbyl, and heterohydrocarbyl; X and Y are independently selected from the group consisting of oxygen and sulfur; Z is selected from the group consisting of $OR^9$ and $NR^{10}R^{11}$; and $R^9$, $R^{10}$, and $R^{11}$ are independently selected from the group consisting of hydrocarbyl and heterohydrocarbyl.

DETAILED DESCRIPTION

Figure 1A:
FIGS. 1A and 1B are views of a material suffering from corrosion.

In general, the invention provides a corrosion inhibitor which includes one or more quaternary ammonium compounds. The quaternary ammonium compounds can be used alone or in a mixture with additional compounds. For example, one or more quaternary ammonium compounds can be mixed with one or more phosphate esters for use as a corrosion inhibitor. Moreover, one or more thiocarbonyl compounds can be added to the mixture of a quaternary ammonium compound and a phosphate ester.

Suitable quaternary ammonium compounds are represented by the following formula:

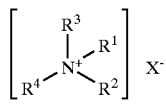

wherein $R^1$, $R^2$, $R^3$, $R^4$ are independently a hydrocarbyl group; and X is halide (F, Cl, Br, I) or sulfate.

The term "hydrocarbyl" refers to an organic group composed of carbon and hydrogen. It includes alkyl, alkenyl, and alkynyl groups which are each straight chain, branched chain, or cyclic hydrocarbons from one to about twenty carbons. Also included are aryl groups composed of carbon and hydrogen. For example, hydrocarbyl includes, but is not limited to, methyl, ethyl, propyl, butyl, pentyl, hexyl, octyl, decyl, dodecyl, tetradecyl, iso-dodecyl, iso-tridecyl, 2-ethyl-1-hexyl, 2-octyl-1-dodecyl, 2-decyl-1-tetradecyl, 2-octyl, cyclopropyl, cyclobutyl, cyclopentyl, cyclohexyl, methylcyclopentyl, ethenyl, propenyl, butenyl, pentenyl, hexenyl, ethyne, propyne, butyne, pentyne, hexyne, phenyl, naphthyl, anthracenyl, benzyl, and isomers thereof.

Preferably, $R^1$ and $R^2$, are independently a hydrocarbyl group containing from 1 to 6 carbon atoms. More preferably, $R^1$ and $R^2$, are independently a hydrocarbyl group containing from 1 to 5 carbon atoms. Even more preferably, $R^1$ and $R^2$, are independently a hydrocarbyl group containing from 1 to 3 carbon atoms. Preferably, $R^3$ and $R^4$ are independently a hydrocarbyl group containing from 7 to 20 carbon atoms. More preferably, $R^3$ and $R^4$ are independently a hydrocarbyl group containing from 7 to 15 carbon atoms. Even more preferably, $R^3$ and $R^4$ are independently a hydrocarbyl group containing from 8 to 12 carbon atoms. Preferably, X is a halide; more preferably X is chloride.

Useful quaternary ammonium compounds include, but are not limited to, dinonyl-dimethyl ammonium chloride, dioctyl-dimethyl ammonium chloride, diheptyl-dimethyl ammonium chloride, didecyl-diethyl ammonium chloride, didecyl-dipropyl ammonium chloride, didecyl-dimethyl ammonium fluoride, didecyl-dimethyl ammonium bromide, didecyl-dimethyl ammonium idodide.

Preferably, the quaternary ammonium compound is didecyl-dimethyl-quaternary ammonium chloride.

Additional suitable quaternary ammonium compounds are disclosed in the following U.S. patents, which are incorporated herein by reference: 5,756,004; 5,246,607; 4,547,303; 4,494,977; 4,418,195; 4,372,775; 4,371,497; 4,346,217; 4,342,584; 4,339,349; 4,336,156; 4,323,461; 4,323,459; 4,316,007; 4,309,383; 4,264,768; 4,259,483; 4,217,329; 4,200,634; 4,200,633; 4,146,711; 4,146,709; 3,974,220; and 3,945,849.

The quaternary ammonium compound may be used alone or in a mixture with one or more additional components. For example, a quaternary ammonium compound can be blended with a conventional corrosion inhibitor, such as imidazolines, amines, dimer-trimer acid, and other commonly used oilfield corrosion inhibitors. Of course, a suitable quaternary ammonium compound can also be blended with one or more phosphate esters and/or thiocarbonyl compounds.

Suitable phosphate esters are represented by the following formula:

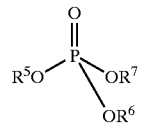

wherein $R^5$, $R^6$, and $R^7$ are individually hydrogen, a hydrocarbyl group, or a heterohydrocarbyl group.

The term "heterohydrocarbyl" refers to a hydrocarbyl group which additionally contains at least one heteroatom such as oxygen (O), nitrogen (N), phosphorus (P), or sulfur (S). The heteroatom(s) may be present in a chain, in a branch from a chain, and/or in a cyclic group. For example, heterohydrocarbyl includes, but is not limited to, chemical species containing alkoxy, carbonyl, thioalkyl, amino, amido, cyano, nitro, and heterocyclic groups.

Preferably, $R^5$ is a polyoxyalkylated alcohol having an alcohol portion and a polyoxyalkyl portion. The alcohol portion may be derived from a saturated or unsaturated alkyl radical having from about 1 to about 20 carbon atoms, an aryl radical, or an alkylaryl radical having an alkyl substituent containing from about 1 to about 20 carbon atoms which may be saturated or unsaturated. Preferably, the alcohol portion has from about 6 to 14 carbon atoms. The polyoxyalkylated portion may be derived from the polymerization of monomers which may be ethylene oxide, propylene oxide, a polyoxy alkanol having from about 2 to about 10 carbon atoms, or a combination of these. The polymerization yields a heterohydrocarbyl chain containing oxygen at least in the main chain. The number of monomer derivatives of any single type in the chain may be from about 1 to about 100. The moieties $R^6$ and $R^7$ may also be as described for $R^5$, but need not be identical to $R^5$ or to each other. A preferred phosphate ester is poly(oxy-1,2-ethandiyl) tridecyl hydroxy phosphate. This particular phosphate ester is commercially available under the tradename RHODAFAC® RS-410 (RHODIA, Cranbury, N.J.). Other phosphate esters under the tradename RHODAFAC® or other products of other tradenames can also be used in embodiments of the invention. Additional suitable phosphate esters are disclosed in the following U.S. patents, which are incorporated herein by reference: 5,925,601; 5,464,551; 5,205,951; 4,758,359; 4,461,713; 4,087,386; 3,992,309; and 3,931,023. In general, phosphate esters may be the reaction products of an alcohol with polyphosphoric acid or phosphorus pentoxide.

Suitable thiocarbonyl compounds are represented by the following formula:

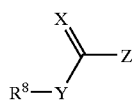

wherein X and Y are independently oxygen (O) or sulfur (S), and Z is either $OR^9$ or $NR^{10}R^{11}$, and wherein $R^8$ is hydrocarbyl, heterohydrocarbyl, or an ionic species. $R^9$, $R^{10}$, and $R^{11}$ are individually a hydrocarbyl group or a heterohydrocarbyl group. The term thiocarbonyl includes thiocarbonates, xanthates, thiocarbamates, and dithiocarbamates. The moieties $R^9$, $R^{10}$, and $R^{11}$ can be independently selected from the following groups, which may be substituted or unsubstituted: $C_1$–$C_{12}$ alkyl, $C_2$–$C_8$ alkenyl, $C_3$–$C_6$ alkynyl, phenyl, $C_7$–$C_{10}$ phenylalkyl, $C_3$–$C_7$ cycloalkyl, $C_5$–$C_7$ cycloalkenyl, $C_2$–$C_8$ alkoxyalkyl, $C_2$–$C_8$ alkylthioalkyl, $c_3$–$C_8$ alkoxyalkenyl, and $C_3$–$C_8$ alkylthioalkenyl. The substituents may be independently halo, cyano, nitro, trifluoromethyl, $C_1$–$C_4$ alkyl, or $C_1$–$C_4$ alkoxy. When Z is $NR^{10}R^{11}$, $R^{10}$ and $R^{11}$ together with the nitrogen atom to which they are bound may form a species such as pyrryl, pyridyl, and $C_2$–$C_6$ polyalkyleneimine.

$R^8$ may be $C_1$–$C_{12}$ alkyl, $C_2$–$C_8$ alkenyl, $C_3$–$C_6$ alkynyl, phenyl, $C_7$–$C_{10}$ phenylalkyl, $C_3$–$C_7$ cycloalkyl, $C_5$–$C_7$ cycloalkenyl, $C_2$–$C_8$ alkylthioalkyl, $C_3$–$C_8$ alkoxyalkenyl, and $C_3$–$C_8$ alkylthioalkenyl; all of which may be substituted or unsubstituted. Substituents, if present, may be halo, cyano, nitro, trifluoromethyl, $C_1$–$C_4$ alkyl, and $C_1$–$C_4$ alkoxy. Alternatively, $R^8$ may be an ionic species. That is, the thiocarbonyl compound can be present as a salt with an ammonium ion or with a metal ion such as potassium, sodium, lithium, calcium, or magnesium.

Preferably, the thiocarbonyl compound is potassium dimethyl dithiocarbamate. Other suitable dithiocarbamates include, but are not limited to, sodium dimethyl dithiocarbamate, ammonium dimethyl dithiocarbamate, magnesium dimethyl dithiocarbamate, potassium diethyl dithiocarbamate, sodium diethyl dithiocarbamate, ammonium diethyl dithiocarbamate, potassium dipropyl dithiocarbamate, sodium dipropyl dithiocarbamate, ammonium dipropyl dithiocarbamate, etc. In addition to what has been disclosed herein, additional suitable thiocarbonyl compounds are disclosed in the following U.S. patents, which are incorporated herein by reference: 5,843,873; 5,639,465; 5,223,477; 5,180,416; 5,153,219; 4,980,366; 4,946,923; 4,785,109; 4,720,497; 4,692,186; 4,689,387; 4,668,800; 4,582,528; 4,525,479; 4,521,320; 4,509,974; 4,486,449; 4,314,841; 4,193,891; 4,147,715; 4,110,319; 4,087,273; and 3,950,534.

The corrosion inhibitor composition may include a quaternary ammonium compound, it may include a quaternary ammonium compound in combination with a phosphate ester, or it may include a quaternary ammonium compound in combination with both a phosphate ester and a thiocarbonyl compound. These ingredients may be combined in any order, with or without a solvent, to provide the corrosion inhibitor composition. Any known solvents can be used in embodiments of the invention. Typically, solvents may be classified as water soluble and oil soluble. Water soluble solvents include, but are not limited to, water, alcohol, mixtures of water and alcohol. Oil soluble solvents include, but are not limited to, hydrocarbon fluids, such as kerosene, gasoline, diesel, etc.

The ingredients may also be combined with other additives. For example, supplemental corrosion inhibitors may be added. Supplemental corrosion inhibitors include for example, amines, including diamines, fatty amines, polyamines, alkoxylated amines, and hydrogenated fatty amines; amides, including fatty acid amides; and imidazolines, including alkoxylated imidazolines and salts thereof, and quaternized imidazolines. For example, supplemental corrosion inhibitors may be species disclosed in the following U.S. patents, which are incorporated herein by reference: 6,063,972; 5,922,652; 5,565,416; 5,292,480; 4,950,474; 4,867,888; 4,846,980; 4,787,455; 4,636,256; and Re. 36,291. Further additives may, for example, include a scale inhibitor, surfactant, biocide, foamer, and/or oxygen scavenger. These additives are disclosed in U.S. Pat. No. 4,738,897, which is incorporated herein by reference.

Preferably, the corrosion inhibitor is formulated according to Table 1. The term "other" refers to other components, including any supplemental corrosion inhibitors, scale inhibitors, surfactants, biocides, foamers, and oxygen scavengers. Corrosion inhibitor compositions according to the present invention are also referred to as anti-biofoulant corrosion inhibitors, and these terms are used interchangeably.

TABLE 1

| Component | Preferred Range (wt. %) | More Preferred Range (wt. %) | Most Preferred Range (wt. %) |
|---|---|---|---|
| Quaternary ammonium | 1–95 | 1–50 | 1–20 |
| Phosphate ester | 0–95 | 1–50 | 1–20 |
| Thiocarbonyl | 0–95 | 0–50 | 1–20 |
| Solvent | 5–95 | 20–80 | 50–75 |
| Other | 0–95 | 0–50 | 0–20 |

The corrosion inhibitor in accordance with embodiments of the invention can be used in any application where reduction of corrosion is desired. Preferably, the corrosion inhibitor is contacted with iron or a ferrous base material. The term "ferrous base" material is defined as iron-containing (ferrous) alloys, typically containing iron in major amounts. More preferably, various formulations of the corrosion inhibitor can be used to minimize the corrosion of downhole equipment. When desired, a corrosion inhibitor can be delivered to downhole equipment in any feasible manner. For example, various methods and apparatus for inhibiting corrosion are disclosed in the following U.S. patents, which are incorporated herein by reference: 6,089,322; 5,759,485; 5,590,716; 5,565,416; 5,531,934; 5,344, 674; 5,174,913; 5,135,999; 5,084,210; 5,081,209; 4,971,709; 4,964,468; 4,950,474; 4,867,888; 4,664,193; 4,655,287; 4,650,594; 4,636,256; 4,556,110; 4,511,001; 4,460,482; 4,435,361; 4,420,414; 4,416,333; 4,339,349; 4,326,585; and 4,295,979.

Without being bound by any theory of operation, it is believed that oxygen acts to change the characteristics of the surface iron carbonate film on iron or a ferrous base material. For example, in sweet oilfield fluids, the presence of oxygen allows the reduction of $H_2CO_3$ to be more efficient. ("Corrosion Consequences of Oxygen Entry Into Sweet Oilfield Fluids" R. Martin, SPE Paper #71470, 2001) It is thought that the presence of the corrosion inhibitor and its components acts to change the chemical and electrochemical properties of the surface layer so as to protect the underlying iron or ferrous base material from the conditions at the interface of the surface layer and the fluids.

Corrosion inhibitor compositions of the present invention can provide a tenacious, smooth, protective film that resists adhesion of iron sulfide, sessile bacteria, and other solids. These inhibitors offer unique corrosion inhibitor properties through an improved filming process. The anti-biofoulant properties of the inhibitor can provide exceptional surface activity to prevent or resist deposition of iron sulfide, bacteria, mineral scales and other suspended solids from adhering to the metal. This extends the integrity of the protective inhibitor film. Of course, a good protocol of other chemical programs, such as dispersants, surfactants, inhibitors, solvents, acids, and EPA registered biocides, applied by batch or continuous means, play an important role in the total scheme of oil well control.

Figure 1B:
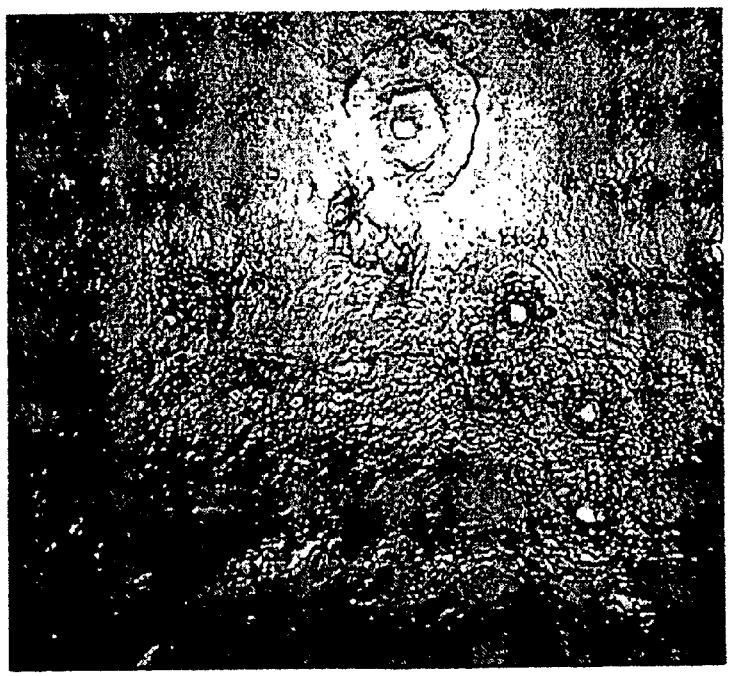

If a deposit of iron sulfide, iron oxide, iron carbonate, calcium carbonate, calcium sulfate, barium sulfate, paraffin, asphaltene, sessile bacteria, sand, silt or clay forms in the system, then under deposit corrosion is common. The deposit shields the metal surface from treatment programs. The deposit allows acid gases such as carbon dioxide or hydrogen sulfide to accumulate under it and lower the pH of trapped fluids. Values of pH less than 1 have been measured under these deposits, and this can create a very aggressive corrosion mechanism with severe and deep pitting, leading to high failure rates. Referring to FIG. 1A, a segment of pipe can become covered with a layer of iron sulfide and biofilm. Removal of the deposits reveals the resulting corrosion pits (FIG. 1B).

The best method of controlling under deposit corrosion is to maintain a clean system and prevent the deposits from forming. The present corrosion inhibitor compositions are designed to provide a very tenacious inhibitor film and surfactancy to disperse deposits of iron sulfide and anaerobic biofilm. If an operating system is contaminated with such biofilm, a treatment comprised of an EPA registered biocide approved for the application, combined with surfactants, detergents, and possibly acid, may be utilized for removing or destroying the biofilm before applying corrosion control. The present corrosion inhibitor compositions are useful for addressing corrosion in problem wells, flowlines and injection systems that typically do not respond to routine treatment. The high degree of surfactancy in these products cleans the metal surface and helps lay a unique protective film that resists adhesion of solids.

The following description is given to exemplify embodiments of the invention. They do not intend to limit the invention as otherwise described and claimed herein.

EXAMPLES

Example 1

Oil-soluble, Water-Dispersible Corrosion Inhibitor Composition

This anti-biofoulant corrosion inhibitor is a concentrated, oil-soluble, water-dispersible filming type corrosion inhibitor and is formulated with a dispersant package that penetrates, wets, and flushes solids from the system. The inhibitor film is very tenacious, persistent and resists adhesion of most solids including iron sulfide, mineral scales, and sessile bacteria. The inhibitor is used to control corrosion caused by carbon dioxide and hydrogen sulfide. Further it reduces the occurrence of under-deposit corrosion by maintaining a clean, solids-free system. The inhibitor is designed for batch or continuous treatment of downhole or flow line applications in wells that produce oil and water.

Treatments are usually initiated with an application of a surfactant to clean heavy deposits of solids residue, iron sulfide and biofilm. Application of an EPA Registered biocide may be necessary to sterilize the system. The biocide treating fluids should be recovered before initiating the inhibitor treatment. The inhibitor is then applied, where it exhibits strong surfactancy to help place an inhibitor film on the metal and to maintain a clean system. The inhibitor provides a smooth, persistent film that resists adhesion of most solids, including iron sulfide and bacteria colonies.

Initial treatments are typically at 40 to 50 ppm of inhibitor. Subsequent treatments may be at 25 to 35 ppm, based on the initial results. Batch treatment should be circulated long enough to displace the annular volume at least one time. Truck treatments should be flushed with sufficient volume of produced water or crude oil to assure that the chemical is ultimately displaced from the annulus.

An exemplary composition of an oil-soluble water-dispersible anti-biofoulant corrosion inhibitor is the following:

| | |
|---|---|
| Hydrocarbon solvent | 55–75% |
| Film-forming amine | 5–10% |
| Alcohol solvent | 3–9% |
| Organic fatty acid | 5–15% |
| Non-emulsifying agent | 1–5% |
| Quaternary ammonium compound | 9–18%. |

A preferred composition of an oil-soluble water-dispersible anti-biofoulant corrosion inhibitor is the following:

| | |
|---|---|
| Aromatic solvent | 34.84% |
| Amido-imidazoline | 7.55% |
| Isopropyl alcohol | 4.10% |
| Dimer-trimer acid | 8.61% |
| Non-emulsifying agent | 2.64% |
| Kerosene | 29.44% |
| Didecyl dimethyl quaternary ammonium chloride | 13.00%. |

Example 2

Water-soluble Anti-Biofoulant Surfactant

A water-soluble anti-biofoulant surfactant is a formulated surfactant with strong penetrating properties to loosen, wet, condition and disperse masses of solids found in fouled systems. This surfactant is used to penetrate, loosen and disperse masses of iron sulfide, corrosion by-products and biofilm found in fouled systems. The cleaning action conditions the system for laying a good inhibitor film and helping biocide treatments reach areas under deposits. The surfactant is designed for batch or continuous treatment of downhole and flow line producing applications that are fouled with iron sulfide, corrosion by-products, and biofilm. Treatments are usually applied at a rate of 100 ppm until the system begins to show signs of clean-up. As the solids are penetrated and removed, application of an approved EPA Registered biocide is used to sterilize the system. An anti-biofoulant corrosion inhibitor is then applied to deliver strong surfactancy as well as film persistency to place an inhibitor film on the metal, and maintain a dean system. The dosage and treatment frequency depends on the depth of the well, fluid volume and the severity of the corrosion problem. Optimum treatment is determined by close monitoring. An exemplary composition of an anti-biofoulant surfactant is the following:

| Inert carrier | 20–50% |
|---|---|
| Quaternary ammonium Compound | 40–70%. |

A preferred composition of an anti-biofoulant surfactant is the following:

| Water | 37.5% |
|---|---|
| Didecyl dimethyl quaternary ammonium chloride | 62.5%. |

Example 3

Water-soluble Oil-dispersible Corrosion Inhibitor Composition

A typical water-soluble, oil-dispersible filming type anti-biofoulant corrosion inhibitor is formulated with a dispersant package that penetrates, wets, and flushes solids from the system. The inhibitor film is very tenacious, persistent and resists adhesion of most solids including iron sulfide, mineral scales, and sessile bacteria. The inhibitor is used to control corrosion caused by carbon dioxide and hydrogen sulfide. Further it can reduce the occurrence of under-deposit corrosion by maintaining a clean, solids-free system. The inhibitor is designed for continuous treatment of downhole or flow line producing applications that are high water cut and for water injection systems. This inhibitor has shown excellent results in gas flow systems with elevated velocities. Because of the high film persistency, batch treatments are also applicable. Treatments are usually initiated with an application of an anti-biofoulant surfactant to clean heavy deposits of solids residue, iron sulfide and biofilm. Application of an EPA Registered biocide may be necessary to sterilize the system. The inhibitor is then applied where it exhibits strong surfactancy as well as film persistency to place an inhibitor film on the metal, and maintain a clean system.

Initial treatments are typically at 100 ppm of inhibitor. Subsequent treatments may be at 30 to 50 ppm, based on the initial results. Batch treatments should be circulated long enough to displace the annular volume at least one time. Truck treatments should be flushed with sufficient volume of produced water or crude oil to assure that the chemical is ultimately displaced from the annulus. The dosage and treatment frequency depends on the depth of the well, fluid volume and the severity of the corrosion problem. Optimum treatment is determined by close monitoring. An exemplary composition of a water-soluble, oil-dispersible anti-biofoulant corrosion inhibitor is the following:

| Water/alcohol carrier | 50–80% |
|---|---|
| Quaternary ammonium compound | 8–20% |
| Organic fatty amine | 1–4% |
| Phosphate ester | 0–5% |
| Organic fatty acid | 0–5%. |

A preferred composition of a water-soluble, oil-dispersible anti-biofoulant corrosion inhibitor is the following:

| Isopropyl alcohol | 50.00% |
|---|---|
| Water | 30.00% |
| Didecyl dimethyl quaternary ammonium chloride | 3.06% |
| Ethoxylated tallow amine | 2.30% |
| Phosphate ester | 1.16% |
| Tall oil | 0.70% |
| Alkyl pyridine quaternary ammonium chloride | 12.78%. |

Example 4

Oxygen Tolerant Corrosion Inhibitor

A typical oxygen-tolerant anti-biofoulant corrosion inhibitor includes a quaternary ammonium compound, a phosphate ester, and a thiocarbonyl compound. This formulation can also be effective in forming an inhibitor film which is tenacious and persistent. This inhibitor is further effective at controlling corrosion when sour fluids are contaminated with oxygen. An exemplary composition of an oxygen tolerant corrosion inhibitor is the following:

| Water | 27.00% |
|---|---|
| Methanol | 21.80% |
| Isopropyl alcohol | 20.00% |
| Monoethylamine | 2.20% |
| Didecyl dimethyl quaternary ammonium chloride | 11.00% |
| Phosphate ester | 13.00% |
| Carbamate | 5.00%. |

Example 5

Field treatments

Successful field treatments with anti-biofoulant inhibitors, like most other chemical applications, begin with a good protocol. A thorough assessment of the system will reveal the type and extent of fouling. Depending on the degree of fouling, the system may need cleaning in order to start with reasonably clean surfaces. Injection of an anti-biofoulant surfactant can penetrate downhole deposits, and the surfactancy can assist in sloughing and flushing the solids from the system. Heavy deposits of iron sulfide may require an add wash with special penetrating surfactants. This should be followed by a biocide application to sterilize the system. With the system clean, the anti-biofoulant corrosion inhibitors can then be applied. The unique film that is developed provides a slick surface where iron sulfide, iron carbonate, mineral scales, and even bacteria do not adhere. The amount of soluble iron from corrosion is reduced and iron sulfide deposit formation is inhibited. Bacteria and biofilms are minimized due to the cleanliness of the system. Subsequent infrequent applications of biocide to treat planktonic bacteria can successful, even with reduced frequency and contact time. An anti-biofoulant corrosion inhibitor may be applied like most other corrosion inhibitors. They can be fed continuously into the system via chemical pump, either on the surface or downhole, or they can be applied by batch treating.

A typical treatment program is as follows:

1. Survey the system—Determine the severity or extent of the fouling in the system. Observe the quality of the water going to injection or disposal. Are there heavy deposits of iron sulfide, paraffin, or scale? Determine the methods of application dictated by the downhole completion.

2. Clean the system—As a rule of thumb, the more severely fouled, the more rigorous the cleaning program must be. Scale deposits should be removed with proper chemical application. Scale inhibition should be initiated. Paraffin deposits should be removed with solvents, dispersants, or thermal methods depending on the nature of the deposit. Massive iron sulfide accumulations should be removed with an acid wash containing a good wetting agent.

For moderately fouled systems and most initial applications of anti-biofoulant corrosion inhibitors, begin continuous addition of anti-biofoulant surfactant at the rate of 50 to 60 ppm for a period of two weeks. Observe the quality of the water until it begins to clean up. Expect dirty water when the treatment begins. Batch treatments can be used if well conditions permit. Batch 5 to 10 gallons in a 5 to 10 barrel slug of clean produced water. Repeat the batch treatment twice a week for two weeks. Observe water quality to determine if additional treatments are necessary. This last step is to treat for bacteria control and to sterilize the system. Apply an approved EPA registered biocide in a quantity to control the planktonic bacteria. Monitor with bacteria counts to determine when control has been achieved.

3. Apply Anti-Biofoulant Inhibitor—Anti-biofoulant corrosion inhibitors can be applied by batch treating (as in Truck Treating) or by continuous injection. Handle the application as with any other treating program, and monitor for corrosion control with the tools available. Typically coupons, probes, iron/manganese counts, and well failure records may be used according to the system environmental parameters.

In downhole applications and production systems, start treatment with anti-biofoulant corrosion inhibitor at the rate of 40 to 50 ppm or batch with 3–4 gallons in the usual fashion. After a period of time, when corrosion control has been reached and routine biocide treatments are controlling bacteria, it may be possible to shift to a maintenance mode of treating. This will require fairly close monitoring to determine if the system has a propensity to return to a more corrosive state. Some systems may not be receptive to a maintenance mode of treating.

Likewise, after clean-up, high water-cut production and water disposal systems can be inhibited with anti-biofoulant corrosion inhibitor at a treating rate of 40 to 50 ppm. Batch Treating may also be applicable in most systems. After a period of time, when monitoring indicates corrosion control and water quality have been established, a maintenance treatment may be feasible. Monitoring is essential until the system has determined to be receptive to a maintenance treatment.

Example 6

Comparative test of corrosion inhibitors

Several low-pressure gas wells in the Texas Panhandle used electric sub-pumps to remove sour brine so economical amounts of gas would be produced. These wells had experienced severe corrosion, especially in the lower sections of tubing and in the motor shrouds. Iron sulfide build-up had also created operational problems.

Since the produced water was black even before air contact and the pattern of corrosion damage was broad, smooth pits (suggestive of oxygen influenced sour corrosion), oxygen contamination was suspected. PAIR probes (PETROLITE, Houston) were installed in flowlines of the three test wells and Potentiodyne Analyzer (PETROLITE, Houston) tests made. Since oxygen contamination in sour fluids takes the form of an oxygen/sulfur intermediate, cathodic polarization curves generated by a Potentiodyne are the best way to measure an oxygen influence in sour fluids. (R. L. Martin, *Materials Performance*, Vol. 18, No. 3, pp. 41–50, March (1979); R. L. Martin, *Materials Performance*, Vol. 22, No. 9, pp. 33–36, September (1983): R. L. Martin and R. R. Annand, *Corrosion*, Vol. 37, No. 5, pp. 297–301, May (1981)).

Two of the test wells showed an oxygen influence equivalent to 1 to 2 ppm oxygen, definitely a significant amount. In these wells, inhibited corrosion rates were 4–5 mils per year (mpy) for the general rate, and 50–80 mpy for the pitting rate. Uninhibited rates were 15–35 mpy general (uniform thinning) rate. In the test well that showed no significant oxygen, a conventional corrosion inhibitor was controlling corrosion to 0.2 mpy general, 4 mpy pitting. The uninhibited general rate without oxygen was about 4 mpy. The source of the oxygen could not be identified with certainty.

A change was made to weekly batch-and-flush treatments with an oxygen tolerant corrosion inhibitor. Produced water became clear even from the contaminated wells. Corrosion rates measured on the PAIR probes were lowered to 0.1–0.2 mpy general rate on all the test wells. These wells have now produced several months without a corrosion failure or an iron sulfide-related problem, even though some corrosion had taken place before the corrosion inhibitor was applied.

Corrosion inhibition tests were carried out in brines containing dissolved carbon dioxide and/or hydrogen sulfide and/or oxygen. The corrosion rate of quaternary ammonium compound (designated "B") was found to be substantially reduced in sweet (all $CO_2$) corrosion tests by addition of phosphate esters. This quaternary ammonium compound has unique surface cleaning properties. Thiocarbonyl compounds provide additional inhibition. Amines can also be added to provide vapor space inhibition. The corrosion inhibitors give superior corrosion inhibition against the mechanism for which they are designed and superior surface cleanliness.

TABLE 2

| Inhibitor | $CO_2$ Tests Corrosion Rate (mpy) | $CO_2 + H_2O + O_2$ Tests Corrosion Rate (mpy) |
|---|---|---|
| None | 40 | 53 |
| B | 11 | 5.4 |
| B + C1 0.6/1 ratio | 3.1 | |
| B + C1 1/1 ratio | 2.1 | 4.4 |
| B + C1 2/1 ratio | 2.9 | |
| B + C2 (1/1 ratio) | 6.3 | |

TABLE 2-continued

| Inhibitor | $CO_2$ Tests Corrosion Rate (mpy) | $CO_2 + H_2O + O_2$ Tests Corrosion Rate (mpy) |
|---|---|---|
| C1 | 5.5 | 6.4 |
| B + C1 + S1 | 1.3 | |
| B + C1 + S2 | 0.9 | 2.5 |
| B + C1 + A1 | 1.8 | |
| B + C1 + A2 | 1.6 | |

B = quaternary ammonium compound
C1 = phosphate ester of oxyalkylated tridecyl alcohol
C2 = phosphate ester
S1 = thiocarbonate
S2 = dithiocarbamate
A1 = ethylene diamine
A2 = butyl amine Example 7

Corrosion inhibition laboratory test

Figure 2:
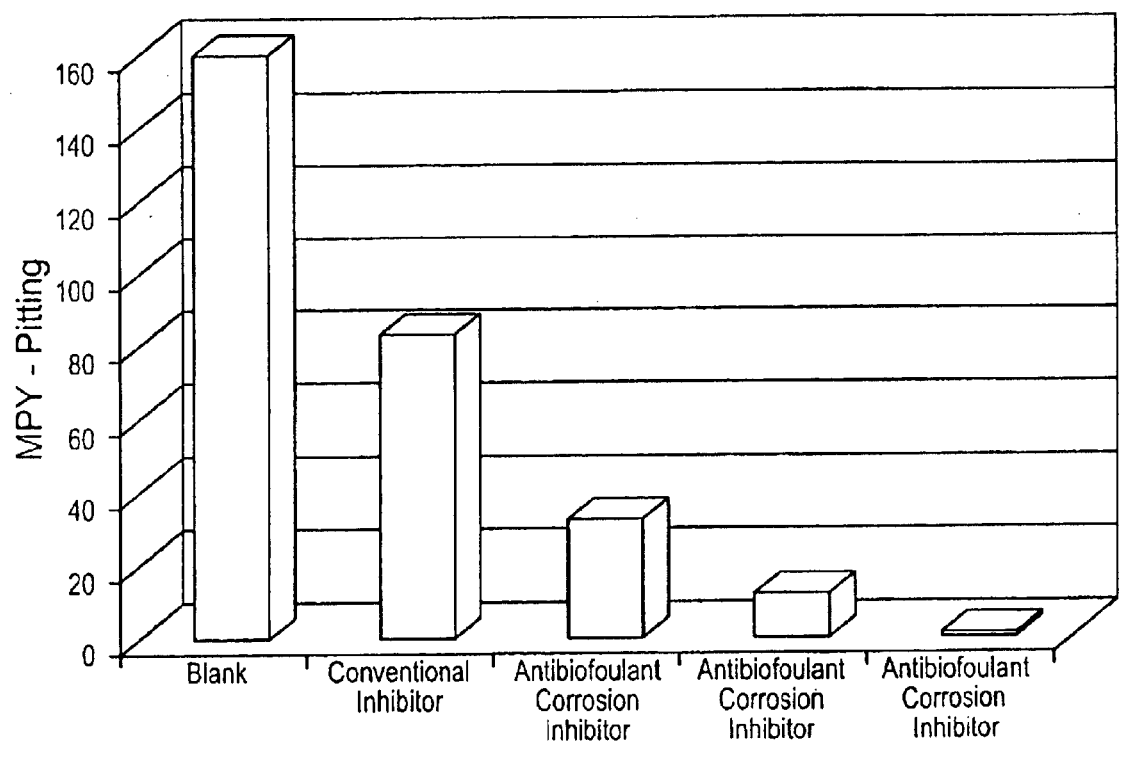
FIG. 2 is a graph of pitting rates for a side stream system for different corrosion inhibitors.

Anti-biofoulant corrosion inhibitor formulations were laboratory tested by Potentiodyne analysis for lowering pitting corrosion rates, and by wheel tests for film persistency. FIG. 2 compares pitting rates measured on a side stream system in a water flood known for severe iron sulfide deposition, biomass, and calcium carbonate deposits.

Figure 3:
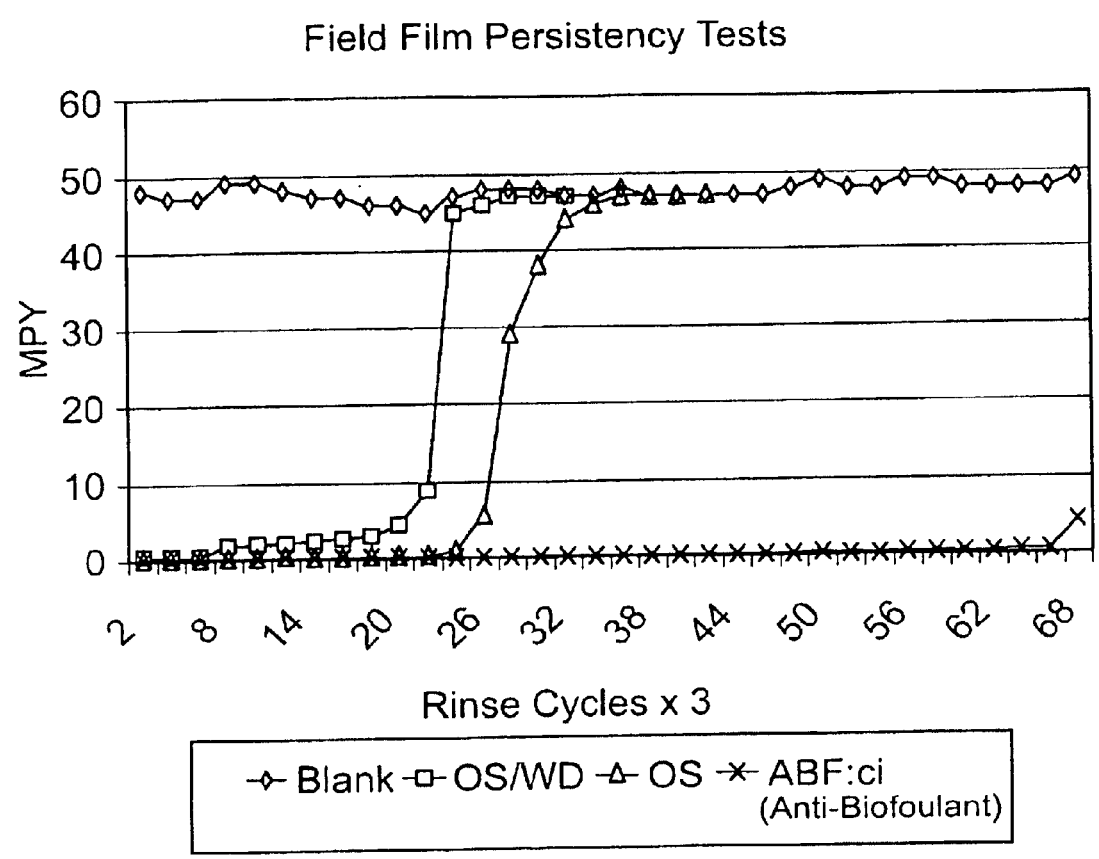
FIG. 3 is a graph of film persistency as a function of rinse cycles.

Film persistency tests were conducted with field fluids caught under pressure, and injected into purged cells. A typical oil-based, filming-amine inhibitor lasted three rinses. The anti-biofoulant corrosion inhibitor persisted through 3 times as many cycles extending over a period of three days. The graph in FIG. 3 illustrates the differences in film persistency for a variety of corrosion inhibitors.

Example 8

Corrosion inhibition field test

Figure 4:
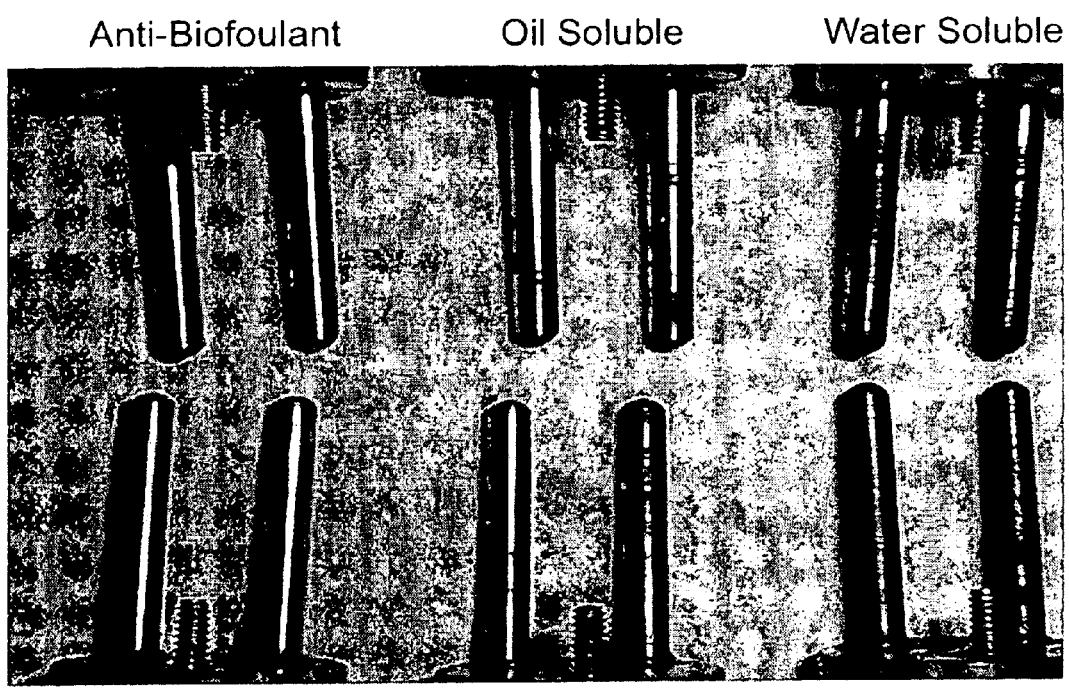
FIG. 4 is a view of corrosion probes which were protected by different corrosion inhibitors.

Field performance data were gathered by PAIR Meter Probes located in a side stream system at a location known for under-deposit corrosion problems. Not only did comparison of corrosion rates indicate the anti-biofoulant corrosion inhibitor gave superior results, but also the probes showed no build-up of iron sulfide deposits like the other products under test. The appearance of the film on the probe had a patina unlike any inhibitor tested, as shown in FIG. 4.

Field performance was also measured by other normal tests. Coupons were installed and analyzed. Iron and manganese concentrations were measured and monitored to assure corrosion control during the field applications. Water quality was monitored with a side stream filter as well as millipore filters. Probably the most significant, field failure reports were carefully screened.

Example 9

California field application

The problems in a small oil-producing field in the coastal region of California had steadily grown worse under treatment using a typical corrosion inhibitor. Treatments were aimed at symptoms and slowly the amount of various treating chemicals had grown significantly. In addition, failure rates had steadily increased. Because water injectivity was trending downward, additional separation and settling tanks were added to improve water quality for disposal. Iron sulfide deposits in the disposal water were severe. The tanks were supposed to provide more settling time for the solids. Frequent biocide treatments were not controlling bacteria, and changes in product did not improve the performance.

Figure 5:
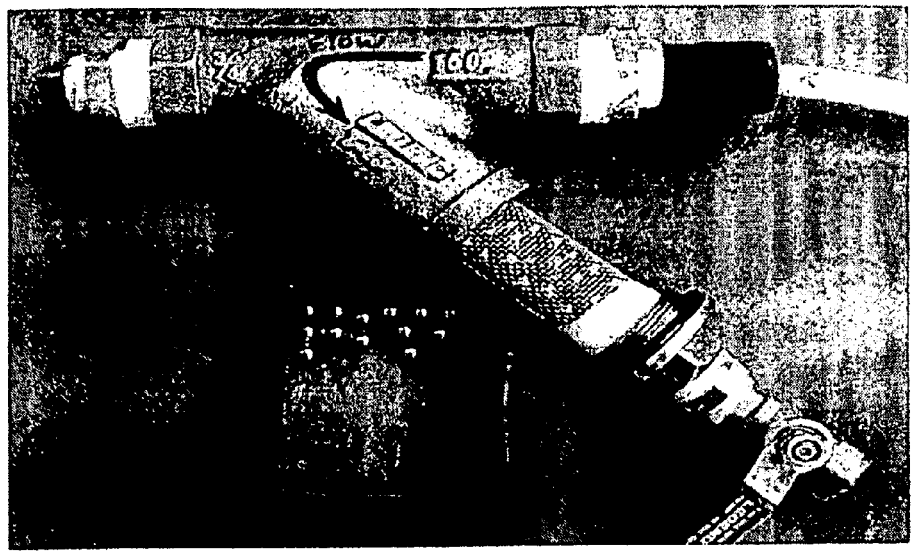
FIG. 5 is a view of a side stream filter.
Figure 6A:
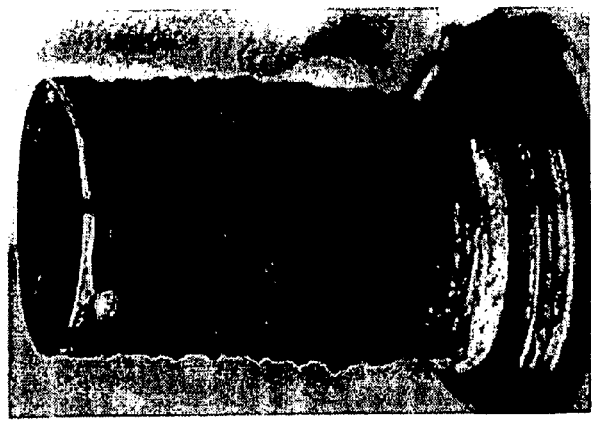
FIGS. 6A and 6B illustrate the water quality as measured with a side stream filter.
Figure 6B:
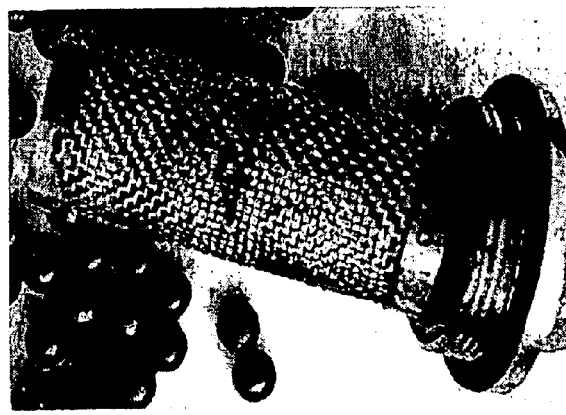
Figure 7:
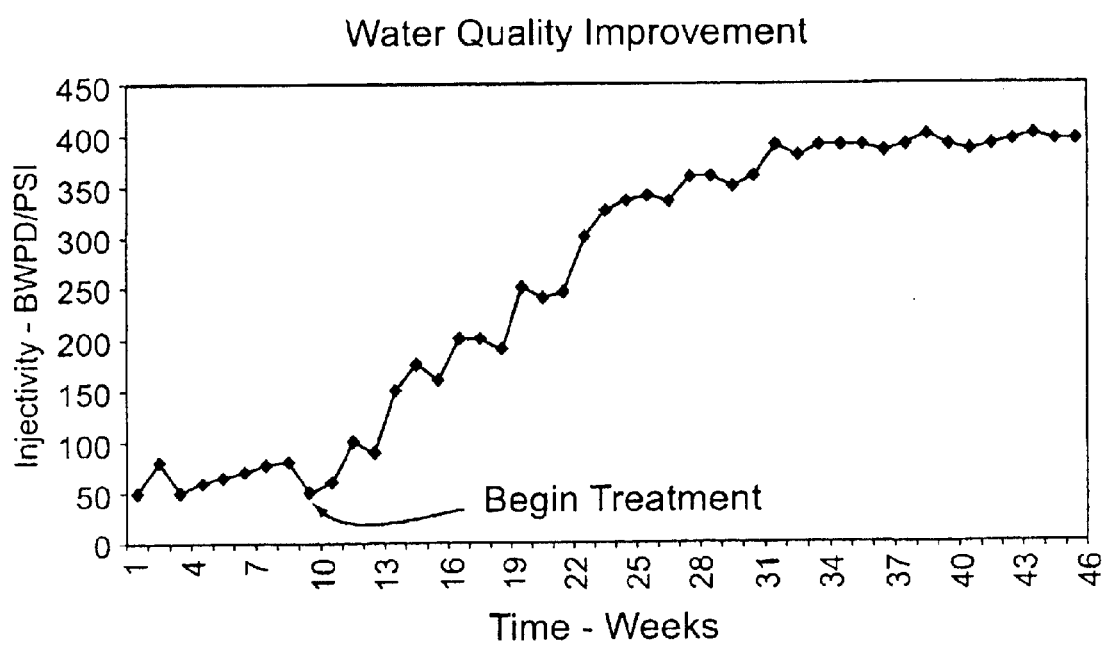
FIG. 7 is a graph of the increase in injectivity over time.

Anti-biofoulant corrosion control treatment protocol started on a ten-well test. A continuous injection of anti-biofoulant surfactant was initiated, both downhole and through the water injection system. This was followed with a flush of an EPA registered biocide. Anti-biofoulant corrosion inhibitor was applied continuously downhole and through the water handling system. After monitoring for the next three months with iron counts at the wellhead, and monitoring the water quality, the application was expanded to all 60 wells. FIG. 5 pictures the side stream filter used for monitoring water quality. FIG. 6 shows the "before" (6A) and "after" (6B) water quality as measured with a side stream filter. FIG. 7 shows the improved water quality as measured by the improved injectivity.

As a result of the improved corrosion-treating program by the anti-biofoulant corrosion inhibitor, the downhole filming practically eliminated iron sulfide, bacteria were controlled with reduced biocide treatments, several surface treating units were taken out of service, and failure rates dropped precipitously. (See Table 3 below for a list of surface treating units taken from service.) Reduction of iron sulfide reduced the need for extra settling vessels. Elimination of the vessels removed the breeding sites for bacteria and control of the system was gained. The process measurement chart in Table 3 gives an overall picture of the success.

TABLE 3

| PROCESS MEASUREMENT | BEFORE | AFTER |
|---|---|---|
| $H_2S$ (ppm) | 100+ | 0 |
| Corrosion rate (mpy) | 31 | 0.5 |
| Solids disposal (Barrels/Month) | 400 | 30 |
| Interface | 20* | 2* |
| Produced water tanks | 14 | 3 |
| Heater/treaters | 3 | 1 |

Because of this performance, anti-biofoulant corrosion inhibitors have been phased into other wells in the field. Even though the other wells were not experiencing high failure rates, the injection water has seen an improvement in quality.

Example 10

New Mexico field application

A fairly sizable field in Eastern New Mexico had 20 wells on one side of the field that were problem wells. Failure rates within the 20 wells were running 5 failures per month, even with high treating rates of corrosion inhibitors and frequent batching with biocide. A close study of the well failures revealed deep pitting by bacteria under deposits. The deposits were analyzed and found to be mostly a biomass of polysaccharides, iron sulfide, and polymer fragments from an earlier polymer flood. Anaerobic bacteria (SRB's) had found safety under the biofilm and were thriving. Deep pits caused failures in the down hole equipment. Larger biocide treatments and more frequent corrosion inhibitor applications did not gain control.

Figure 8:
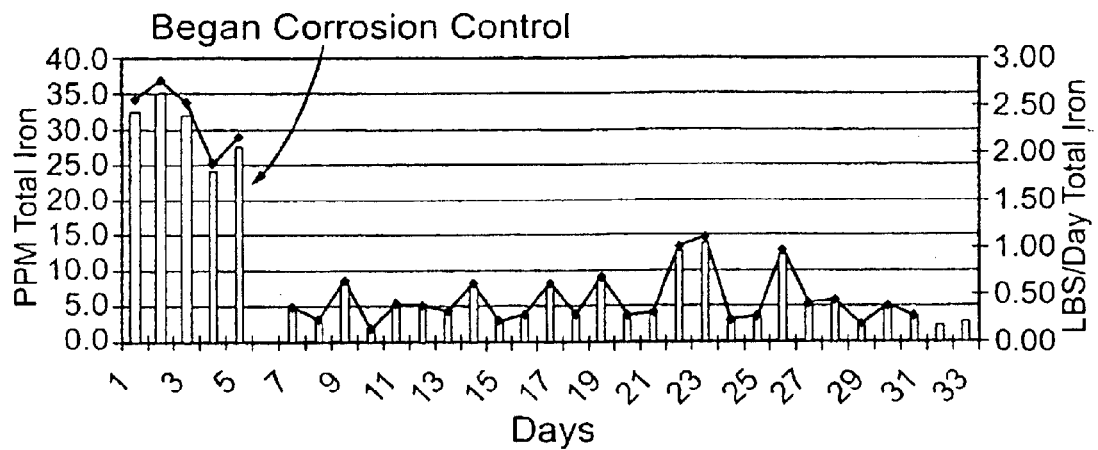
FIG. 8 is a graph of iron count reduction over time.

The treatment began with a downhole acid wash containing penetrating surfactants to remove iron sulfide and some biofilm. All wells were treated with a concentrated batch of EPA registered biocide to sterilize the system. Then, anti-biofoulant corrosion inhibitor was applied with batch treatments. Almost immediately there began a reduction in well failures. The continuing performance of the anti-biofoulant corrosion inhibitor was tracked by water analysis for iron in solution. FIG. 8 records the reduction in iron counts.

Figure 9:
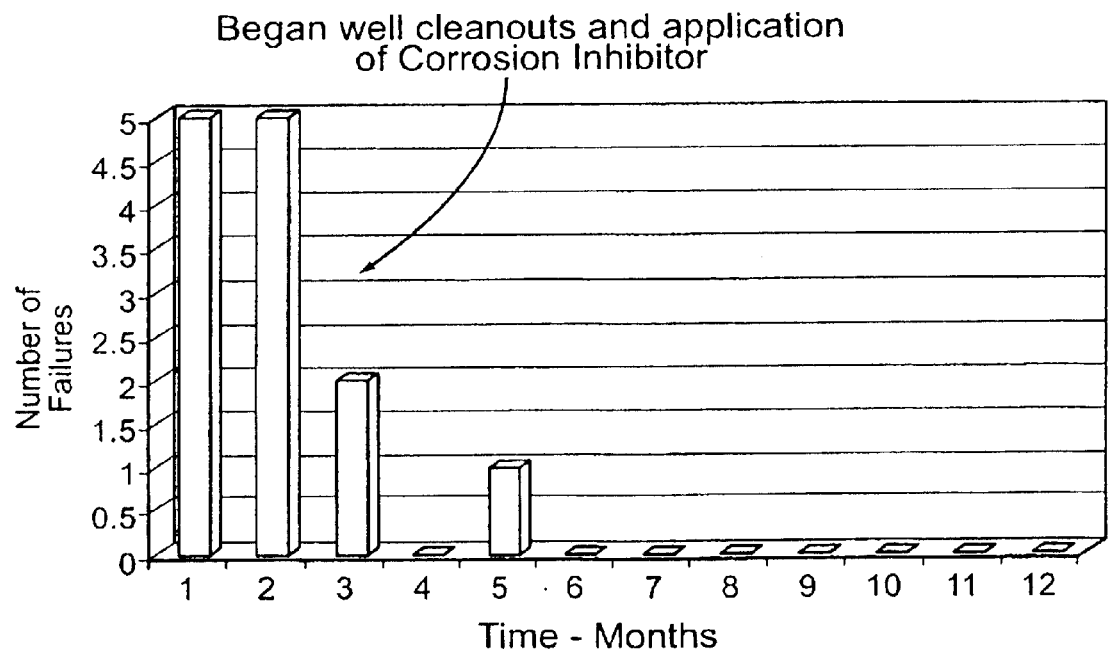
FIG. 9 is a graph of failure rate reduction.

FIG. 9 shows the failure rate before and after the application of the TECHNI-CHEK™ 3125 anti-biofoulant corrosion inhibitor. The work over costs associated with well failures dropped precipitously. In addition, the non-producing down time has been eliminated and manpower requirements have been redirected elsewhere.

Example 11

Texas field application

An older field in the Permian Basin of West Texas was experiencing the problems of many mature properties. There were scattered occasional failures attributed to sour production and some under-deposit corrosion induced by sessile bacteria. Iron sulfide was evident in the produced water.

A test program was initiated with anti-biofoulant corrosion inhibitor. Ten wells were selected to be treated and monitored. Eight wells were batch treated weekly with an equivalent concentration of 75 ppm. The other two were treated continuously with 50 ppm. The wells were followed for 6 weeks measuring corrosion rates with Pair Meter Probes and coupons. Iron counts were also measured.

Throughout the treatment, corrosion rates were very good and water quality was good. At the end of 6 weeks, one well was subjected to a proactive pull. There had been no indication of any failure or other problem. The rods were inspected and found to have a very good inhibitor film. The rods were almost glossy with a patina that was visually discernable. No iron deposits were detected visually or by feel.

Because of the good performance the program was expanded to include about 75% of the wells in the field. Corrosion related failures decreased significantly.

As demonstrated in the above, embodiments of the invention provide a composition and method for inhibiting the corrosion of metals. The composition and method can be applied to reduce or prevent ferrous metal corrosion in downhole equipment. Well failure rates due to metal corrosion are substantially reduced. As a result, the work over costs associated with well failures would decrease significantly. Moreover, the non-producing down time has been eliminated or reduced, thereby resulting in increased productivity. Other advantages and benefits provided by embodiments of the invention are apparent to those skilled in the art.

While the invention has been described with a limited number of embodiments, variations and modifications therefrom exist. For example, the invention can be used in any application where corrosion inhibition is desirable; it is not limited to oil field downhole equipment. Suitable quaternary ammonium, phosphate ester, and thiocarbonyl compounds are not limited to those exemplified herein, any such compounds which are capable of performing substantially the same function can also be used. The appended claims intend to cover all such variations and modifications as falling within the scope of the invention.

What is claimed is:
1. A composition, comprising:
a quaternary ammonium compound of formula (I)

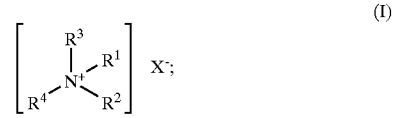

(I)

and a phosphate ester of formula (II);

(II)

wherein $R^1$, $R^2$, $R^3$, $R^4$ are independently a hydrocarbyl group;
$X^-$ is selected from the group consisting of halide and sulfate; and
$R^5$, $R^6$, and $R^7$ are independently selected from the group consisting of hydrogen, a hydrocarbyl group, and a polyoxyalkylated alcohol; and
further comprising a thiocarbonyl compound of formula (III)

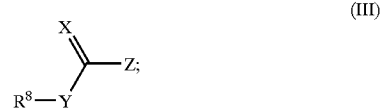

(III)

wherein $R^8$ is selected from the group consisting of metal ion, ammonium ion, hydrocarbyl, and heterohydrocarbyl;
X and Y are independently selected from the group consisting of oxygen and sulfur such that at least one of X and Y is sulfur;
Z is selected from the group consisting of $OR^9$ and $NR^{10}R^{11}$; and
$R^9$, $R^{10}$, and $R^{11}$ are independently selected from the group consisting of hydrocarbyl and heterohydrocarbyl.

2. The composition of claim 1, wherein $R^1$ and $R^2$ contain from 1 to 6 carbon atoms; and $R^3$ and $R^4$ contain from 7 to 20 carbon atoms.

3. The composition of claim 1, wherein $R^1$ and $R^2$ contain from 1 to 5 carbon atoms; and $R^3$ and $R^4$ contain from 7 to 15 carbon atoms.

4. The composition of claim 1, wherein $R^1$ and $R^2$ contain from 1 to 3 carbon atoms; and $R^3$ and $R^4$ contain from 8 to 12 carbon atoms.

5. The composition of claim 1, wherein $R^1$ and $R^2$ are decyl; and $R^3$ and $R^4$ are methyl.

6. The composition of claim 5, wherein $X^{31}$ is a halide.

7. The composition of claim 5, wherein $X^{31}$ is chloride.

8. The composition of claim 1, wherein $R^5$ is a polyoxyalkylated alcohol of from 2 to 500 carbon atoms.

9. The composition of claim 8, wherein the polyoxyalkylated alcohol comprises an alcohol portion of from 1 to 20 carbon atoms.

10. The composition of claim 8, wherein the polyoxyalkylated alcohol comprises an alcohol portion of from 6 to 14 carbon atoms.

11. The composition of claim 8, wherein $R^6$ and $R^7$ are hydrogen.

12. The composition of claim 1, wherein the phosphate ester is poly(oxy-1,2-ethandiyl) tridecyl hydroxy phosphate.

13. The composition of claim 1, wherein X is sulfur.

14. The composition of claim 13, wherein Z is $NR^{10}R^{11}$.

15. The composition of claim 14, wherein $R^{10}$ and $R^{11}$ are independently hydrocarbyl groups of from 1 to 10 carbon atoms.

16. The composition of claim 14, wherein $R^{10}$ and $R^{11}$ are independently hydrocarbyl groups of from 1 to 5 carbon atoms.

17. The composition of claim 15, wherein Y is sulfur.

18. The composition of claim 17, wherein $R^8$ is a metal ion.

19. The composition of claim 1, wherein the thiocarbonyl compound is potassium dimethyl dithiocarbamate.

20. The composition of claim 1, further comprising a solvent.

21. The composition of claim 1, further comprising at least one additive selected from the group consisting of a supplemental corrosion inhibitor, a scale inhibitor, a sufactant, a biocide, a foamer, and an oxygen scavenger.

22. A composition, comprising:
    a quaternary ammonium compound of formula (I)

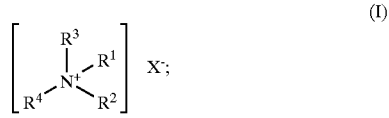

wherein $R^1$, $R^2$, $R^3$, $R^4$ are independently a hydrocarbyl group; a phosphate ester of formula (II);

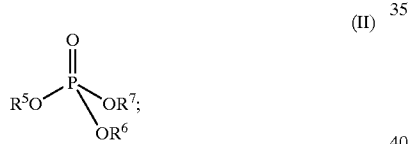

wherein $X^-$ is selected from the group consisting of halide and sulfate; and
$R^5$, $R^6$, and $R^7$ are independently selected from the group consisting of hydrogen, a hydrocarbyl group, and a polyoxyalkylated alcohol; and
a thiocarbonyl compound of formula (III);

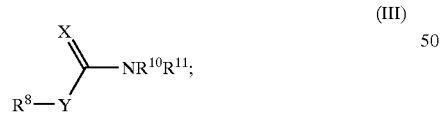

wherein $R^8$ is selected from the group consisting of metal ion, ammonium ion, hydrocarbyl, and heterohydrocarbyl;
X and Y are selected from the group consisting of oxygen and sulfur, such that at least one of X and Y is sulfur; and
$R^{10}$ and $R^{11}$ are independently selected from the group consisting of hydrocarbyl and heterohydrocarbyl.

23. The composition of claim 22, wherein
    $R^1$ and $R^2$ are independently a hydrocarbyl group of from 1 to 6 carbon atoms;
    $R^3$ and $R^4$ are independently a hydrocarbyl group of from 7 to 20 carbon atoms;
    $R^5$ is a polyoxyalkylated alcohol of from 2 to 500 carbon atoms;
    $R^6$ and $R^7$ are independently hydrogen or a hydrocarbyl group of from 1 to 20 carbon atoms;
    X is sulfur; and
    $R^{10}$ and $R^{11}$ are independently hydrocarbyl groups of from 1 to 10 carbon atoms.

24. The composition of claim 22, wherein the quaternary ammonium compound is didecyl dimethyl ammonium chloride; the phosphate ester is poly(oxy-1,2-ethandiyl) tridecyl hydroxy phosphate; and the thiocarbonyl compound is potassium dimethyl dithiocarbamate.

25. The composition of claim 22, further comprising a solvent.

26. The composition of claim 25, further comprising at least one additive selected from the group consisting of a supplemental corrosion inhibitor, a scale inhibitor, a sufactant, a biocide, a foamer, and an oxygen scavenger.

27. The composition of claim 26, wherein
    the quaternary ammonium compound is present at 1–92% by weight;
    the phosphate ester is present at 1–92% by weight;
    the thiocarbonyl compound is present at 1–92% by weight;
    the solvent is present at 5–95% by weight; and
    the at least one additive is present at 1–92% by weight.

28. The composition of claim 26, wherein
    the quaternary ammonium compound is present at 1–50% by weight;
    the phosphate ester is present at 1–50% by weight;
    the thiocarbonyl compound is present at 1–50% by weight;
    the solvent is present at 20–80% by weight; and
    the at least one additive is present at 1–50% by weight.

29. The composition of claim 26, wherein
    the quaternary ammonium compound is present at 1–20% by weight;
    the phosphate ester is present at 1–20% by weight;
    the thiocarbonyl compound is present at 1–20% by weight;
    the solvent is present at 50–75% by weight; and
    the at least one additive is present at 1–20% by weight.

30. The composition of claim 26, wherein the quaternary ammonium compound, the phosphate ester, and the thiocarbonyl compound are present at a 1:1:1 ratio by volume.

31. A method of inhibiting corrosion of iron and ferrous base materials, comprising:
    contacting a material with the composition of claim 1.

32. A method of inhibiting corrosion of iron and ferrous base materials, comprising:
    contacting a material with the composition of claim 31.

33. A method of inhibiting corrosion of iron and ferrous base materials, comprising:
    contacting a material with the composition of claim 24.

34. A method of making a corrosion inhibitor, comprising:
    combining a quaternary ammonium compound of formula (I)

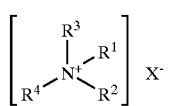

(I)

with a phosphate ester of formula (II)

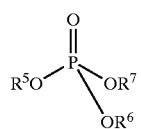

(II)

and further with a thiocarbonyl compound of formula (III)

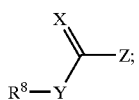

(III)

wherein $R^1$, $R^2$, $R^3$, $R^4$ are independently a hydrocarbyl group;

$X^-$ is selected from the group consisting of halide and sulfate;

$R^5$, $R^6$, and $R^7$ are independently selected from the group consisting of hydrogen, a hydrocarbyl group, and a polyoxyalkylated alcohol;

$R^8$ is selected from the group consisting of metal ion, ammonium ion, hydrocarbyl, and heterohydrocarbyl;

X and Y are independently selected from the group consisting of oxygen and sulfur such that at least one of X and Y is sulfur;

Z is selected from the group consisting of $OR^9$ and $NR^{10}R^{11}$; and $R^9$, $R^{10}$, and $R^{11}$ are independently selected from the group consisting of hydrocarbyl and heterohydrocarbyl.

\* \* \* \* \*